United States Patent [19]

Björshol

[11] Patent Number: 4,638,583

[45] Date of Patent: Jan. 27, 1987

[54] CONVEYER APPARATUS FOR FISHING LINE HAVING SNOODS ALONG ITS LENGTH

[76] Inventor: Kolbjörn Björshol, N-6560, Lanöyneset, Norway

[21] Appl. No.: 676,395

[22] PCT Filed: Mar. 20, 1984

[86] PCT No.: PCT/NO84/00015

§ 371 Date: Nov. 23, 1984

§ 102(e) Date: Nov. 23, 1984

[87] PCT Pub. No.: WO84/03687

PCT Pub. Date: Sep. 27, 1984

[30] Foreign Application Priority Data

Mar. 25, 1983 [NO] Norway ................................. 831077

[51] Int. Cl.⁴ ............................................. A01K 79/00
[52] U.S. Cl. .......................................... 43/4; 43/57.3
[58] Field of Search .................... 43/4, 4.5, 27.4, 57.2, 43/57.3; 198/650, 654

[56] References Cited

U.S. PATENT DOCUMENTS 1,788,353  1/1931  Zademach ........................... 198/650
3,841,011 10/1974  Tison .................................... 43/57.3
4,354,323 10/1982  Huff ..................................... 43/57.3

Primary Examiner—Nicholas P. Godici
Assistant Examiner—Rowan
Attorney, Agent, or Firm—Watson, Cole, Grindle & Watson

[57] ABSTRACT

A conveyer system for an elongated element which is provided with freely suspended thread formed projections spaced along the length of the element, such as a fishing line provided with freely suspended snoods. The system comprises and endless tightly wound helical spring (5) which is passed over turning rollers (6), and means (8) adapted to introduce the thread formed projections (1) between two windings in the helical spring. Two systems are described in which the conveyer system is associated with means used in long line fishing.

2 Claims, 7 Drawing Figures

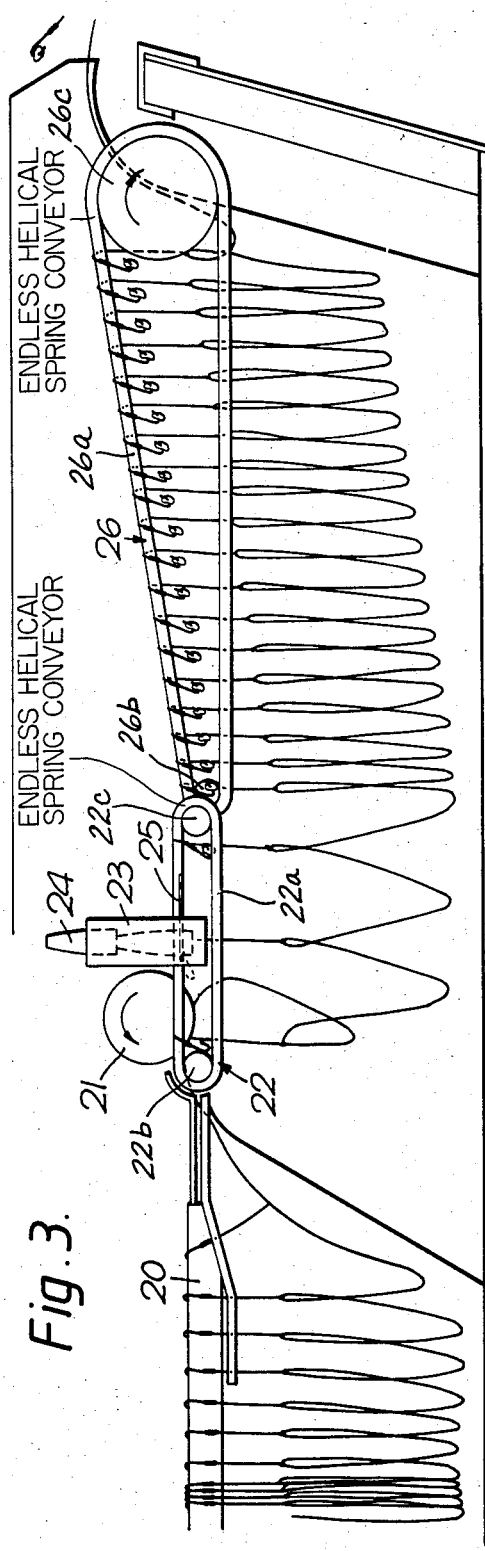
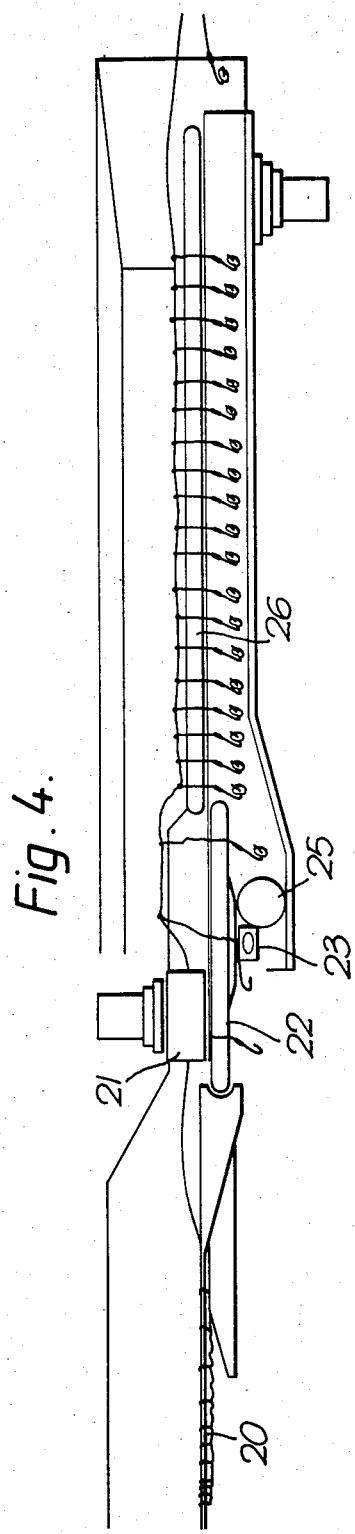
Fig. 3.
Fig. 4.

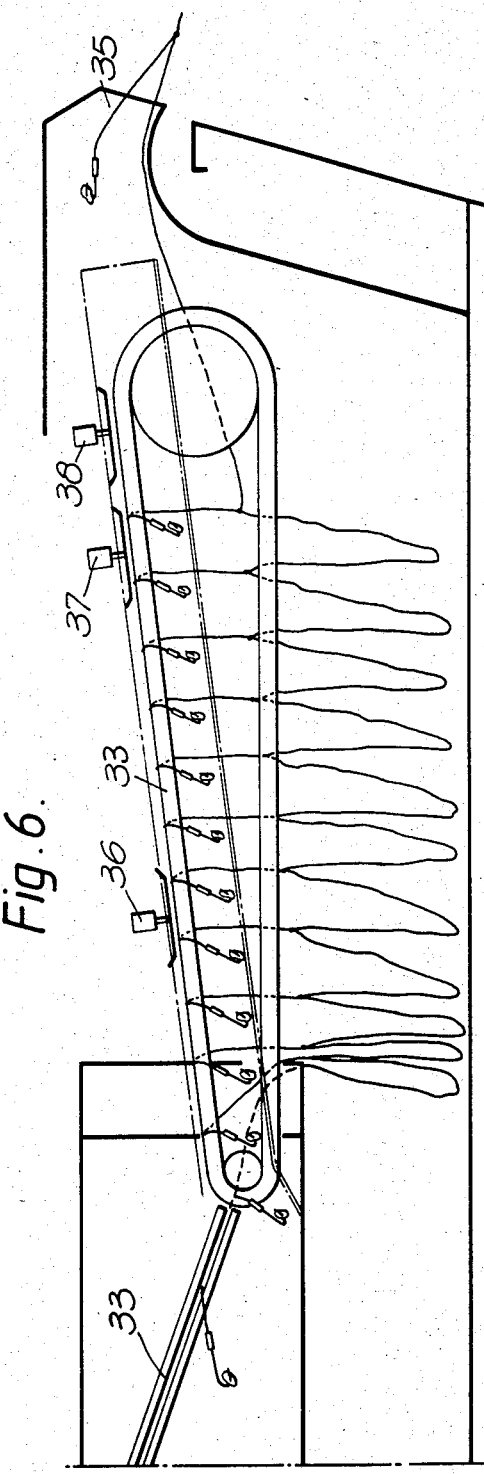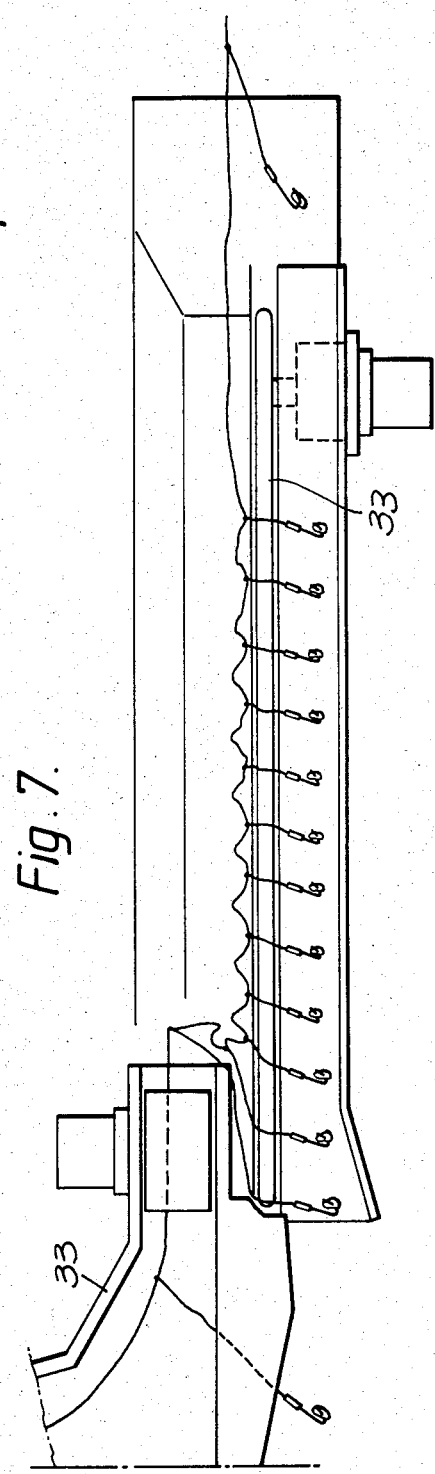

4,638,583

CONVEYER APPARATUS FOR FISHING LINE HAVING SNOODS ALONG ITS LENGTH

BACKGROUND OF THE INVENTION

1. Field of the Invention

The present invention relates to a conveyor apparatus for an elongated element which has freely suspended thread-formed projections spaced along its length, such as a long fishing line which has freely suspended projections along is length in the form of snoods and a pelt-like textile which has freely suspended projections in the form of hairs or fluff.

2. The Prior Art

It has been previously suggested to use helical springs to keep fishing hooks or snoods in a retainer, the individual hook legs or snoods being pinched between two adjacent windings in the spring. However, the hook legs must be manually forced in between the spring windings and again forced out. Consequently, the helical springs are not suited for continuous movement of the hooks, but merely to retain the same.

SUMMARY OF THE INVENTION

According to the present invention, the conveyor apparatus comprises an endless, tightly wound helical spring which is passed over turning rollers, as well as feed means adapted to introduce the thread-formed projections into the interstices provided between adjacent windings in the helical spring as the spring is bent around one of the turning rollers. When the spring straightens between the turning rollers, the adjacent windings will again move together so as to firmly grip the projections placed therebetween.

The invention also comprises a delivery system in which the spring-formed conveyor means constitutes an essential component, i.e., a delivery system for continuous conveyance of a fishing line from one place at which the line is stored or baited to a place at which the line is passed into the sea.

The invention will be better understood by reference to the accompanying drawings, taken in conjunction with the following discussion.

DESCRIPTION OF THE DRAWINGS

FIG. 3 is a side view of a delivery system which includes the inventive helical spring conveyor apparatus.

FIG. 4 is a top view of the delivery system as shown in FIG. 3.

FIG. 6 is a side view, on a larger scale, of the delivery system shown in FIG. 5.

FIG. 7 is a top view of the delivery system shown in the FIGS. 5 and 6.

DETAILED DESCRIPTION OF THE PREFERRED EMBODIMENTS

Figure 1:
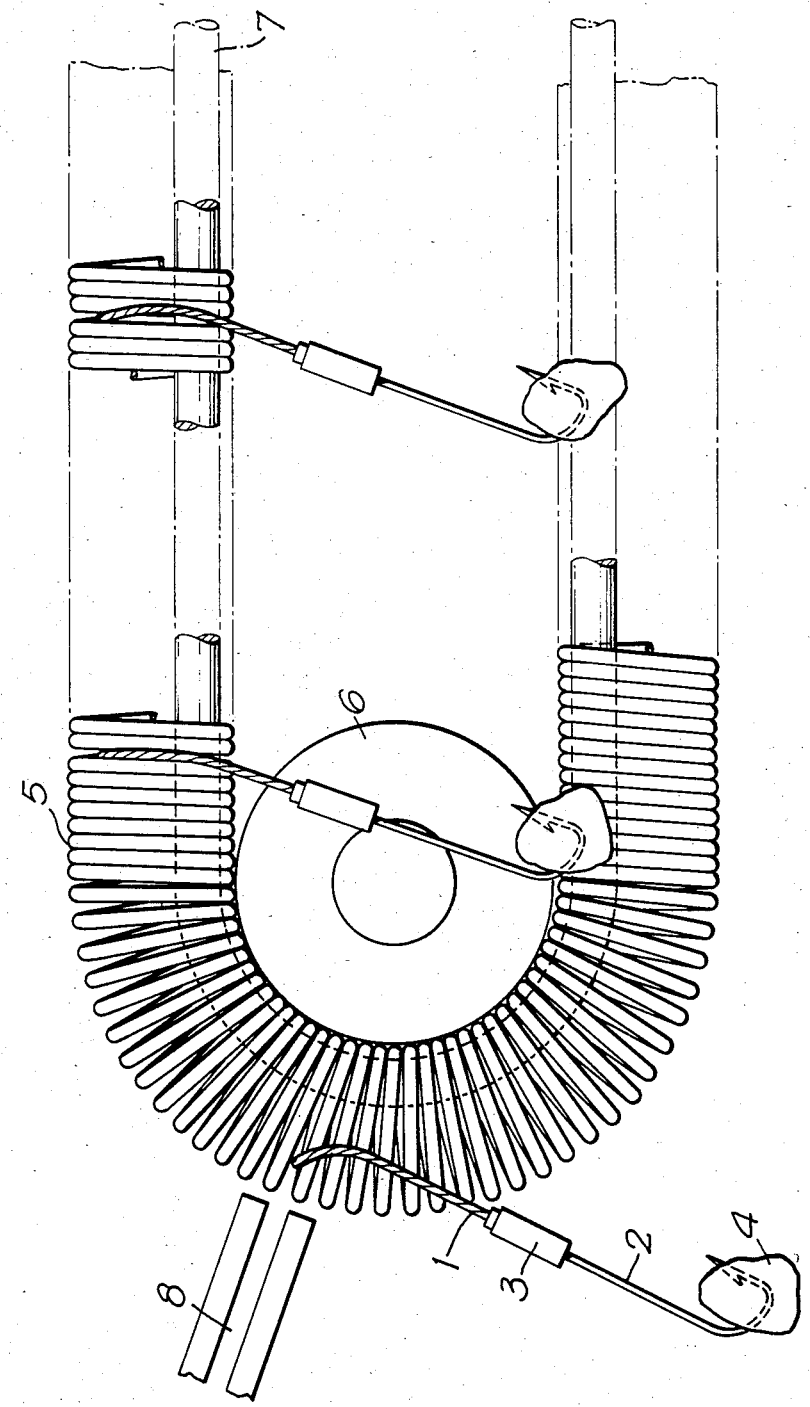
FIG. 1 is a view of one embodiment of the inventive helical spring conveyor apparatus.
Figure 2:
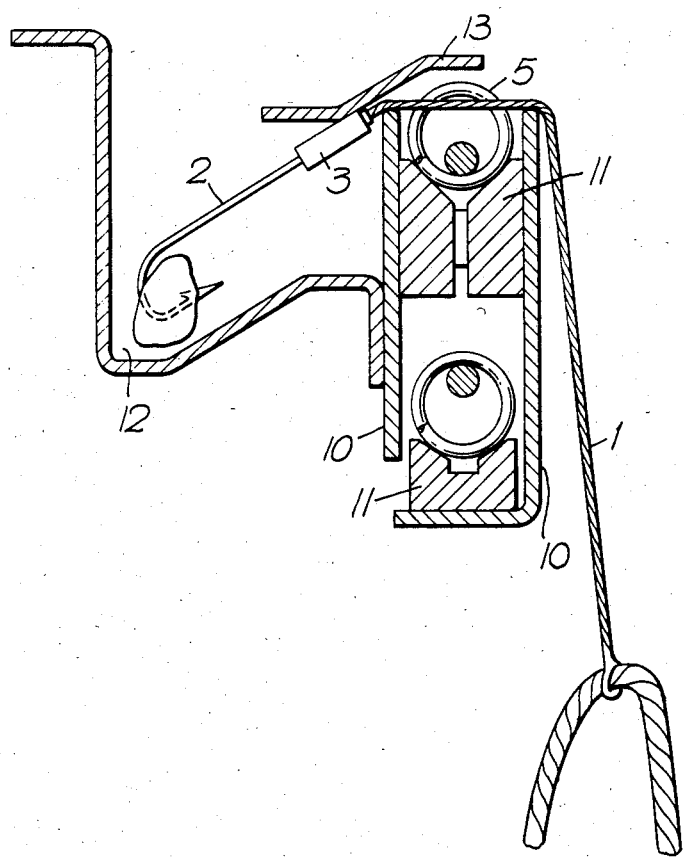
FIG. 2 is a sectional view at right angles to the axis of the helical spring conveyor apparatus as shown in FIG. 1.

FIGS. 1 and 2 show an embodiment of the conveyor apparatus according to the invention which is adapted to convey a fishing line, not shown, which is provided with snoods 1 in spaced arrangement along its length and each snood being provided with a fishing hook 2 secured thereto by means of a snood head 3. Each of the hooks 2 is shown provided with a bait 4.

The conveyor apparatus consists of a tightly wound tension spring 5 which is so spliced as to work like a belt between a pair of turning rollers 6. The spring 5 is kept tight by a solid element such as a wire 7 which is enclosed in the spring.

In the drawing only one end, the insertion end i.e., of the apparatus is shown, it being assumed that the other end, the extraction end is constructed in the same manner as the insertion end.

The turning rollers 6 are made with such a diameter that the spring 5 is subjected to a bending which corresponds to such a space between the windings as to permit a snood 1 to be passed from a feed device which provides a guide slot 8 into the space and be released, respectively. When the spring 5 is leaving the insertion turning roller, the space between adjacent windings is again closed and the snood is pinched until the windings in question open again at the extraction end of the system.

As shown in FIG. 2, the spring 5 passes between two plates 10 and rests upon guides 11. The hooks 2 with their baits 4 are forwarded in a chute 12 at the side of the spring 5. A guide rail 13 is mounted above the spring 5 and prevents the spring 5 from surmounting the top edge of the side plates 10, at the same time as the rail 13 keeps each of the hooks 2 with its bait 4 in the chute 12.

In systems for automatic baiting of fishing lines it is usual to effect the baiting while rapidly forwarding the hooks at the same speed that the line is passed into the sea, i.e., the speed of the vessel. This means that the hooks enter their bait at a speed which may be of the order 3 to 5 m/sec. Such a speed makes great demands on the baits and the consistance of the baits, as a great hook speed easily may cause the hook to be torn out of the bait or prevent the bait from becoming sufficiently secured to the hook. When passing the line into the sea, the bait may easily be shaken off the hook, either because the baits are not sufficiently secured or because the line is alternately tightened and slackened while baiting the individual hooks, i.e., upwards to 3 to 4 times per second.

Consequently, it is advantageous if the hook speed during the baiting can be reduced, as thereby a better control of the baiting is obtained, so that the demands on bait and bait consistancy may be reduced. This might be achieved by placing a buffer at the side of the baiting apparatus or between the same and the place where the line is passed into the sea, so that the baiting proper may be effected at a constant speed, independently of variations in the speed of the vessel such as due to sea. Such a buffer also will reduce the tightening and slackening of the line to the effect that shaking off of the bait from its hook is avoided. In this manner it is achieved that the now usual relation between the hook speed during baiting and the passing out speed of the line which may be obtained by the use of a buffer may be from 1/10 to 1/20.

A delivery system in which the buffer region is obtained by means of a conveyor apparatus according to the invention is schematically shown in FIGS. 3 and 4. In this delivery system a line which is provided with snoods 4 and hooks 2 is suspended from a guide rail 20 of any known type. By means of a driven roller 21 the line is drawn towards the passing out point at the stern of the vessel (to the right in the drawing). At the same time the snoods with their hooks are passed to a conveyor apparatus 22, for instance a conveyor apparatus as shown in FIG. 1 and including an endless helical spring 32a which moves around turning rollers 22b and 22c which passes the snood with hook to a baiting apparatus 23 with a distance between the hooks which is adapted to the speed of operation of such apparatus, for instance 10 to 15 cm. In the apparatus 23 baits 24 are passed downwardly to a knife 25 which cuts the bait so that the hook is passed into a ready cut bait.

When the hook is baited, it is passed to a buffer conveyor 26 by means of the conveyor apparatus 22. The conveyor 26 may, possibly, be an extension of the conveyor apparatus 22, but is shown made similar to the apparatus described with respect to FIGS. 1 and 2 and includes an endless helical spring 26a which moves around turning rollers 26b and 26c. Turning roller 26b is located adjacent turning roller 22c so that individual snoods released from adjacent windings of the helical spring 22a as it passes around the turning roller 22c will transfer into the spacing between adjacent windings of the helical springs 26a as it passes around the turning roller 26b. A guide surface (not labeled in FIG. 4) assists in this transfer. By means of this delivery system the line with baited hooks is passed towards the stern of the vessel where the line is torn out of the space between two spring windings and passed into the sea in the conventional manner.

In the delivery system shown in FIGS. 3 and 4 in which the conveyor system 22 and the buffer conveyor 26 are two separate units, the speeds of the two conveyors may be so adjusted that the distance between the individual hooks in the conveyor 22 is substantially greater, for instance 2 to 3 times the distance between the hooks in the conveyor 26, in which the distance, in practice, may be as small as 4 to 5 cm, with a correspondingly greater number of hooks fastened in the conveyor.

Figure 5:
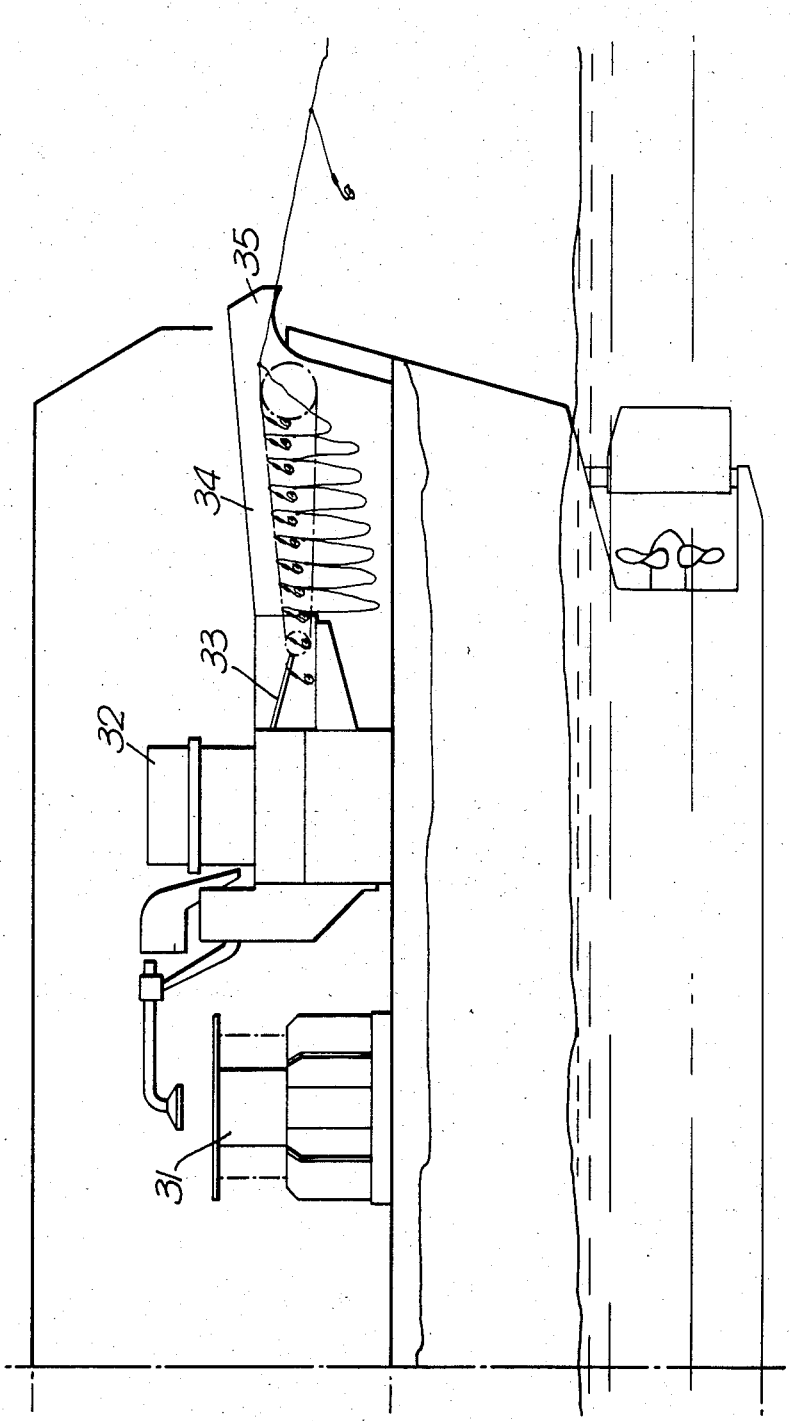
FIG. 5 is a side view of another delivery system which uses a helical spring conveyor apparatus according to the invention.

FIGS. 5, 6 and 7 illustrate another delivery system in which the inventive conveyor apparatus is adapted to cooperate with a baiting machine which is supplied with line from a line spool. In this case the conveyor apparatus serves both as a conveyor and as a buffer store for baited line.

Due to seawaves the speed of the vessel may vary substantially. The present delivery system makes it possible to operate the baiting machine with an approximately constant speed equal to the mean speed of the vessel.

Due to short distance between the hooks in the conveyor, the line proper will be hanging from each hook, as indicated in FIG. 5, as the conveyor speed is by far less than the speed of the vessel. The relation between the two speeds may be about 1:20. This means a conveyor speed of about 0.2 to 0.3 m/sec. At such a speed the baited hooks may be inspected before being passed into the sea, with the advantages involved thereby.

In the delivery system as shown in the FIGS. 5 to 7, 31 is a spool which is adapted to receive a fishing line provided with snoods and hooks in conventional manner.

From the spool 31 the line is fed to a baiting machine 32 which, possibly, may be combined with an apparatus for hooking the individual snoods and which is provided with outlet 23 which passes the baited line to a conveyor apparatus which is generally designated 34 and which is more closely described above with respect to FIGS. 1 and 2.

The conveyor catches, in turn, the individual snoods 1 and holds them during passing towards the stern 35. Hereby, the snoods with baited hooks are hanging to one side of the conveyor, as shown in FIG. 7, while the rest of each individual snood and the entire line hang on the other side. The snoods leave, in turn, the conveyor and the line is passed over the stern 35 by pull in the line, with a speed which is adjusted in relation to the speed of the baiting machine and the speed of the vessel in the sea.

As shown in FIG. 6, the conveyor apparatus 34 is provided with feelers 36 and 37 for the adjustment of the conveyor speed in dependency of the filling in the conveyor apparatus. Further, a feeler 38 is arranged for arresting the baiting machine 32 and the conveyor system 34 when the latter is full.

I claim:

1. A delivery system for delivering a fishing line which has freely suspended snoods along its length from a first location to a second location, said delivery system comprising a first conveyor apparatus and a second conveyor apparatus, said first conveyor apparatus comprising
first and second spaced apart turning rollers, said first turning roller being positioned at said first location and said second turning roller being positioned at an intermediate location between said first and second locations,
a first endless helical spring having tightly wound windings movably mounted around said first and second turning rollers, adjacent windings of said endless helical spring being partially separated as said endless helical spring passes around each of said first and second turning rollers, and
a feed element positioned adjacent said first turning roller to sequentially place individual snoods attached to said fishing line in the spacing between adjacent windings of said endless helical spring as it passes around said first turning roller, said individual snoods being released from between adjacent windings as said endless helical spring passes around said second turning roller,
said second conveyor apparatus comprising
third and fourth spaced apart turning rollers, said third turning roller being positioned at said intermediate location and said fourth turning roller being positioned at said second location, and
a second endless helical spring having tightly wound windings movably mounted around said third and fourth turning rollers, adjacent windings of said second endless helical spring being partially separated as said endless helical spring passes around each of said third and fourth turning rollers, said third turning roller being located relative to said second turning roller such that individual snoods attached to said fishing line which are released from adjacent windings of said first helical spring as it passes around said second turning roller will transfer into the spacing between adjacent windings of said second endless helical spring as it passes around said third turning roller.

2. The delivery system as defined in claim 10, wherein each of said freely suspended snoods attached to said fishing line includes a fishing hook attached thereto, and including a baiting device associated with said first conveyor apparatus for attaching bait to each of said fishing hooks as it is moved from said first location to said intermediate location.

* * * * *